UNITED STATES PATENT OFFICE.

OTTO SŸLLWASSCHY, OF ELLERBECK, PRUSSIA, GERMANY.

METHOD OF PRESERVING FISH.

SPECIFICATION forming part of Letters Patent No. 352,666, dated November 16, 1886.

Application filed June 12, 1886. Serial No. 204,979. (No specimens.) Patented in Germany February 9, 1884, No. 28,752; in England September 29, 1884, No. 12,929; in Denmark January 23, 1885, No. 1,708, and in Sweden February 13, 1885.

*To all whom it may concern:*

Be it known that I, OTTO SŸLLWASSCHY, a subject of the King of Prussia, and residing at Ellerbeck, Prussia, Germany, have invented a new and useful Improvement in the Method of Preserving Fish, (for which I have obtained Letters Patent of Great Britain, No. 12,929, dated September 29, 1884, German Imperial Patent No. 28,752, dated February 9, 1884, Patent of Sweden, having no number, dated February 13, 1885, and Patent of Denmark, No. 1,708, dated January 23, 1885,) of which the following is a specification.

This invention relates to a new mode of preserving smoked fish, whereby they may be kept for a long period of time, and will when properly prepared for use resemble newly-smoked fish in appearance and taste.

The fish after being smoked are cooled off and placed in layers in wooden barrels. Between each layer of fish a layer of dry salt is placed in a quantity of about six pounds of salt to one hundred pounds of fish. The barrels after having been filled are kept in a cool place until the fish have become completely hard in consequence of the salt combining with the natural fat of the fish. This process of hardening must take place through the whole body of each fish, and can be ascertained by pressing the fish with the finger. The finger must leave no recess or impression whatever on the surface of the fish. After the process of hardening has taken place, which will be according to the sort and size of fish from within three to fifteen days, the barrels are filled up with brine, and then closed by a cover fitting tightly. The preparation of the brine must be executed carefully in the following manner: Filtered water is boiled with salt to a saturated solution, which latter is allowed to cool off, after which it is skimmed and drawn off as far as it appears fully clear and pure.

If the brine is not carefully prepared, as above stated, the fish will not keep for so long a time, which will likewise not be the case if the process of hardening, before described, has not completely taken place.

Fish prepared in the mode described will keep for many months, and can be sent to hot climates without danger of spoiling.

For making such preserved fish eatable it must be taken from the barrel and placed in fresh water, to remove its rigidness. This will, according to the size of fish, take place within from three to eight hours, when the salt will be sufficiently removed from the fat. The fish is then dried in the open air, and will now fully resemble newly-smoked fish.

I am aware that fish have been preserved by first salting and then smoking them, and also by salting without smoking them, and hence do not desire to include, broadly, such method of treating fish, but limit my invention to the specific invention herein described.

By first taking the fish in their natural condition and smoking them the juices are retained and the fat of the fish is brought to such condition that the salt, when applied, will readily combine with it and make the fish perfectly hard and solid, especially on the exterior. After the fish are thus smoked and hardened with salt they are brought to a condition in which brine will simply preserve and protect them from atmospheric influences without changing their character in any material way. By thus treating the fish they are preserved without having the entire body of the fish permeated with salt, as after being smoked the dry salt in which they are packed combines chiefly with the fatty substances and forms a hard exterior surface which is not much penetrated by the brine. Consequently the fish when required for use only need be soaked sufficiently to remove the rigidity of the hard exterior and the body of the fish will be similar to fresh fish.

What I claim as my invention, and desire to secure by Letters Patent, is—

The method herein described of preserving fish, consisting in first taking the fish in the natural condition and smoking them, in then packing the smoked fish in layers with dry salt and allowing them to remain until the salt has combined with the smoked fat sufficiently to render the fish perfectly hard on their exterior, and in then filling up the barrels containing the hardened fish with brine and closing them air-tight, substantially as herein described.

OTTO SŸLLWASSCHY.

Witnesses:
F. ENGEL,
H. E. WITT.